(12) United States Patent
Alcantara et al.

(10) Patent No.: US 10,268,420 B2
(45) Date of Patent: *Apr. 23, 2019

(54) SYSTEM AND METHOD FOR CONSISTENT PERFORMANCE IN A STORAGE DEVICE

(71) Applicant: NGD SYSTEMS, INC., Irvine, CA (US)

(72) Inventors: Joao Alcantara, Irvine, CA (US); Ricardo Cassia, Rancho Santa Margarita, CA (US); Kamyar Souri, San Jose, CA (US); Vladimir Alves, Tustin, CA (US); Guangming Lu, Irvine, CA (US)

(73) Assignee: NGD Systems, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/949,814

(22) Filed: Apr. 10, 2018

(65) Prior Publication Data

US 2018/0232180 A1    Aug. 16, 2018

Related U.S. Application Data

(63) Continuation of application No. 15/230,097, filed on Aug. 5, 2016, now Pat. No. 9,983,831, which is a continuation-in-part of application No. 14/806,074, filed on Jul. 22, 2015, now abandoned.

(60) Provisional application No. 62/027,666, filed on Jul. 22, 2014.

(51) Int. Cl.
*G06F 3/06* (2006.01)

(52) U.S. Cl.
CPC ............ *G06F 3/0659* (2013.01); *G06F 3/061* (2013.01); *G06F 3/0604* (2013.01); *G06F 3/0653* (2013.01); *G06F 3/0688* (2013.01)

(58) Field of Classification Search
CPC .... G06F 3/0659; G06F 3/0604; G06F 3/0688; G06F 3/0653
See application file for complete search history.

(56) References Cited

U.S. PATENT DOCUMENTS

| | | |
|---|---|---|
| 2004/0133707 A1 | 7/2004 | Yoshiya et al. |
| 2008/0059828 A1 | 3/2008 | Siggelkow et al. |
| 2009/0150636 A1 | 6/2009 | Gower et al. |
| 2009/0249013 A1 | 10/2009 | Daud et al. |
| 2010/0211702 A1 | 8/2010 | Klapproth et al. |
| 2012/0047318 A1 | 2/2012 | Yoon et al. |
| 2014/0223220 A1 | 8/2014 | Guntur et al. |
| 2014/0365714 A1 | 12/2014 | Sweere et al. |

*Primary Examiner* — Ann J Lo
*Assistant Examiner* — Masud K Khan
(74) *Attorney, Agent, or Firm* — Lewis Roca Rothgerber Christie LLP (57) ABSTRACT

A system and method for providing consistent performance in a storage device, such as a solid state drive. A threshold value for command execution time for a command in a category of command (e.g., a read command or a write command) and a command size, is stored in the storage device. When a host command in the category (e.g., a read command) and corresponding size is received, the storage device executes the command, and if it completes execution of the command in a time that is less than the threshold value, the solid state drive waits until an amount of time equal to the threshold value has elapsed before sending the command completion.

17 Claims, 6 Drawing Sheets

SYSTEM AND METHOD FOR CONSISTENT PERFORMANCE IN A STORAGE DEVICE

CROSS-REFERENCE TO RELATED APPLICATION(S)

This application is a continuation of U.S. patent application Ser. No. 15/230,097, filed Aug. 5, 2016, which is a continuation-in-part of U.S. patent application Ser. No. 14/806,074 filed Jul. 22, 2015, entitled "SYSTEM AND METHOD FOR PROVIDING CONSISTENT, RELIABLE, AND PREDICTABLE PERFORMANCE IN A STORAGE", which claims priority to and the benefit of U.S. Provisional Application No. 62/027,666, filed Jul. 22, 2014, entitled "SYSTEM AND METHOD FOR PROVIDING CONSISTENT, RELIABLE, AND PREDICTABLE PERFORMANCE IN A STORAGE", the entire contents of both of which are incorporated herein by reference.

FIELD

One or more aspects of embodiments according to the present invention relate to persistent storage devices, and more particularly to a system and method for achieving consistent performance in a storage device.

BACKGROUND

Persistent storage devices such as solid state drives (SSDs) may have performance characteristics that depend on various factors, such as the extent to which storage areas of the device have been marked as invalid, or the number of programming and erase cycles to which physical blocks of the storage areas device have been subjected. In some applications performance which is on occasion significantly faster than average, or faster than expected, may be inconvenient.

Thus, there is a need for a system and method for achieving consistent performance in a storage device.

SUMMARY

Aspects of embodiments of the present disclosure are directed toward a system and method for providing consistent performance in a storage device, such as a solid state drive. A threshold value for command execution time for a command in a category of command (e.g., a read command or a write command) and a command size, is stored in the storage device. When a host command in the category (e.g., a read command) and corresponding size is received, the storage device executes the command, and if it completes execution of the command in a time that is less than the threshold value, the solid state drive waits until an amount of time equal to the threshold value has elapsed before sending the command completion.

According to an embodiment of the present invention there is provided a solid state drive, including: a controller; and a plurality of non-volatile memory devices, the controller including: a performance manager including a first threshold value register; and a host control to: receive a command from a host, the command being a read command or a write command; and send, upon instruction from the performance manager, a command completion to the host, the performance manager being to: monitor an elapsed time after receipt of the command; and instruct the host control to send a command completion to the host when the elapsed time equals or exceeds a value stored in the first threshold value register.

In one embodiment, the performance manager further includes a second threshold value register, and the performance manager is to: instruct the host control to send a command completion to the host when: the command is a read command and the elapsed time equals or exceeds a value stored in the first threshold value register; or the command is a write command and the elapsed time equals or exceeds a value stored in the second threshold value register.

In one embodiment, the performance manager is a circuit consisting of logic gates and flip-flops.

In one embodiment, the performance manager is a sequence of instructions stored as firmware.

In one embodiment, the performance manager is further configured to: store a difference between: the elapsed time after receipt of the command; and the value stored in the first threshold value register, in a first over limit register, when the elapsed time after receipt of the command exceeds the value stored in the first threshold value register.

In one embodiment, the performance manager is further configured to instruct the host control to send a command completion to the host when a sum of: the elapsed time; and a value stored in the first over limit register, equals or exceeds a value stored in the first threshold value register.

In one embodiment, the performance manager further includes a second threshold value register, and the performance manager is to: instruct the host control to send a command completion to the host when: the command has a first size and the elapsed time equals or exceeds a value stored in the first threshold value register; or the command has a second size and the elapsed time equals or exceeds a value stored in the second threshold value register.

According to an embodiment of the present invention there is provided a method for operating a first solid state drive including a controller and connected to a host, the method including: receiving a first command from the host, the first command being a read command or a write command; executing the first command; and when the first command is in a first category and the first command has a first size, waiting, when an elapsed time after receipt of the first command is less than a first threshold value; and sending a command completion to the host, when the elapsed time after receipt of the first command is greater than or equal to the first threshold value.

In one embodiment, the method includes: when the first command is in a second category and has the first size, waiting, when an elapsed time after receipt of the first command is less than a second threshold value; and sending a command completion to the host, when the elapsed time after receipt of the first command is greater than or equal to the second threshold value.

In one embodiment, the first category is a read command category, and the second category is a write command category.

In one embodiment, the method includes, when the first command is in the first category and has a second size: waiting, when an elapsed time after receipt of the first command is less than a third threshold value; and sending a command completion to the host, when the elapsed time after receipt of the first command is greater than or equal to the third threshold value.

In one embodiment, the method includes: storing a difference between: the elapsed time after receipt of the first command; and the value stored in the first threshold value register, in a first over limit register, when the elapsed time after receipt of the first command exceeds the value stored in the first threshold value register.

In one embodiment, the method includes: receiving a second command from the host; executing the second command; and waiting, when a sum of: an elapsed time after receipt of the second command; and a value stored in the first over limit register is less than a fourth threshold value; and sending a command completion to the host, when the sum of: the elapsed time after receipt of the second command; and the value stored in the first over limit register is greater than or equal to the fourth threshold value.

According to an embodiment of the present invention there is provided a method for operating a first solid state drive and a second solid state drive, the method including: connecting the first solid state drive to a first host; sending, by the first host, a plurality of first commands to the drive, each of the first commands being a read command or a write command; recording a plurality of command execution times; and calculating a first threshold value from the plurality of command execution times; connecting the second solid state drive to a second host; receiving, by the second solid state drive, a second command from the second host; executing the second command; and waiting, when an elapsed time after receipt of the second command is less than a first threshold value; and sending a command completion to the second host, when the elapsed time after receipt of the second command is greater than or equal to the first threshold value.

In one embodiment, the method includes, before the sending, by the first host, of a plurality of first commands to the drive, performing, on the first solid state drive, a number of programming and erase cycles, the number corresponding to a number for which the solid state drive is within 20% of its end of life.

In one embodiment, the calculating of a first threshold value from the plurality of command execution times includes taking a largest command execution time from among a plurality of command execution times corresponding to commands, from among the plurality of first commands, in a first category and having a first size.

In one embodiment, the calculating of a first threshold value from the plurality of command execution times further includes setting the first threshold value to be 10% greater than the largest command execution time.

In one embodiment, the sending, by the first host, of a plurality of first commands to the drive includes sending a plurality of first commands having a statistical size distribution and a distribution of intervals between commands corresponding to a stream of commands sent by a host in operation in a collection of servers.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a system and method for consistent performance in a storage device provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
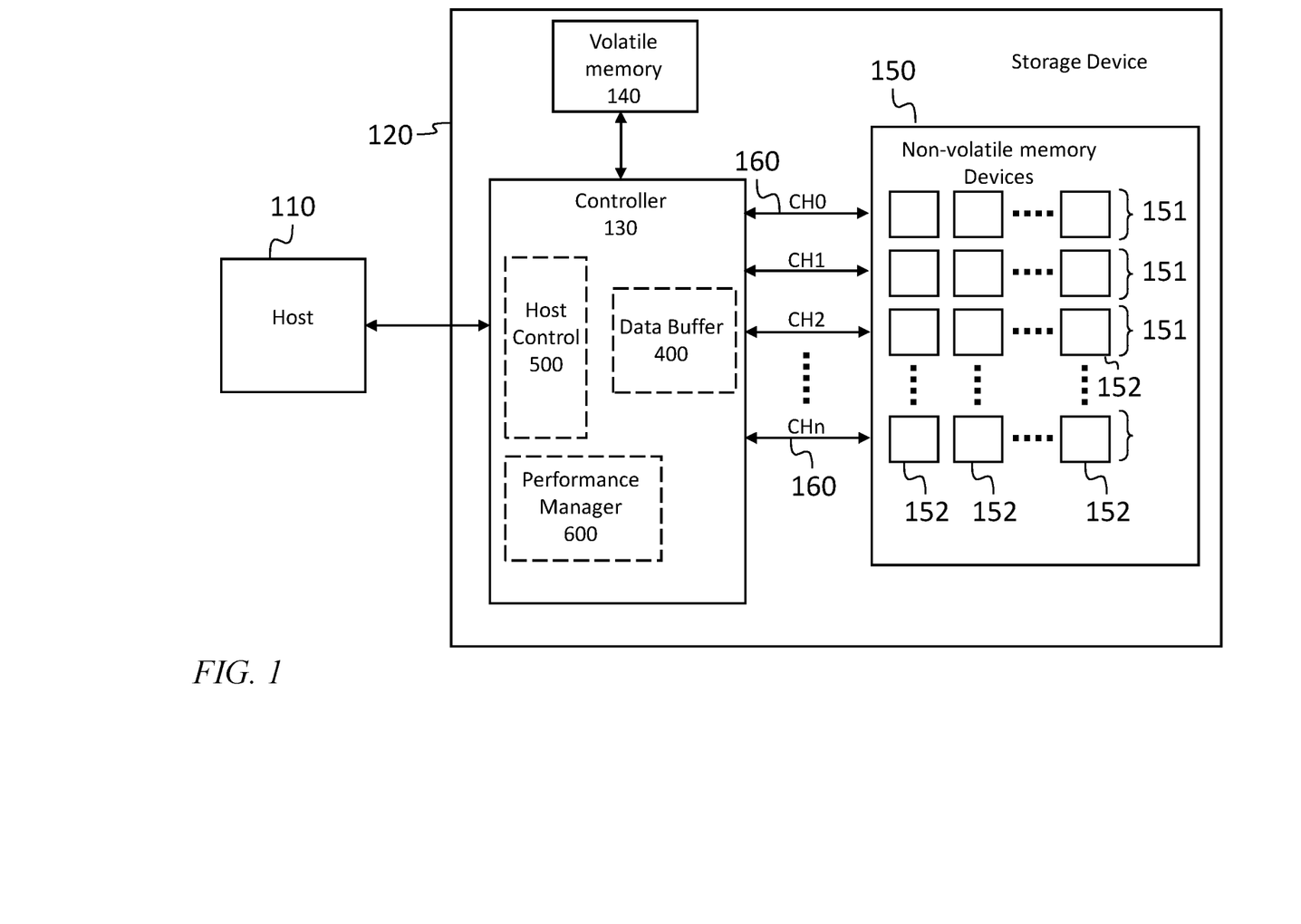
FIG. 1 is a block diagram of an SSD device in communication with a host according to an embodiment of the present invention.

Referring to FIG. 1, in some embodiments a storage device 120 may, in operation, be connected to, and provide storage for, a host 110, e.g., a server or other computer. The host interface (including the host connector, and the communications protocols) between the storage device 120 and the host 110 may be, for example, a storage interface such as Serial Advanced Technology Attachment (SATA), Fibre Channel, Small Computer System Interface (SCSI), Serial Attached SCSI (SAS), Peripheral Component Interconnect Express (PCIe), Non Volatile Memory Express (NVMe), SCSI over PCIe, or a more general-purpose interface such as Ethernet or Universal Serial Bus (USB). In some embodiments, the storage device 120 may conform to a 3.5 inch hard drive form-factor (or "large form factor" (LFF)) standard, or it may conform to a 2.5 inch hard drive form-factor (or small form factor (SFF)) standard. In other embodiments the storage device 120 may conform to a standard PCIe card form factor, e.g., a full-height, full length (FH-FL) card outline, or a full-height, half length (FH-HL) outline.

The storage device 120 may include a controller 130, volatile memory 140, and nonvolatile memory devices 150. The set of nonvolatile memory devices 150 may include physical blocks 151 of flash memory, each containing a plurality of physical pages 152 of flash memory. A plurality of flash channel interfaces 160 may connect the controller 130 to the nonvolatile memory devices 150. Although the alignment of FIG. 1 suggests that there may be one flash channel interface 160 for each physical block 151, in some embodiments a plurality of physical blocks share each flash channel interface 160.

The controller 130 may include a host control 500, a data buffer 400, and a performance manager 600.

In some embodiments, the host 110 sends commands to the storage device 120. These host commands may be related to read or write operations to storage media in the storage device 120, e.g., if the storage device 120 is a solid state drive, the host commands may be related to read or write operations to the nonvolatile memory devices 150. The host commands may be received by the host control 500. The number of read or write commands a storage device is capable of executing per unit of time may be a measure of its performance. The performance, by this measure, may vary significantly for a solid state drive.

For example, if the solid state drive is empty, a host write command may not trigger any data movement in media due to garbage collection, and the command may take only a short time to execute. As data are written to the solid state drive, its behavior may change because of background tasks, such as garbage collection, involving data movement to and from the nonvolatile memory devices 150. This change in the drive behavior may affect the time it takes to complete host commands and therefore may alter the performance of the storage device 120 as seen by the host 110.

In some embodiments, the storage device 120 may, after executing some commands, delay sending a command completion to the host, so that from the perspective of the host, the performance of the storage device 120 is more consistent than it would be if the storage device 120 were to send the command completion immediately after executing each command. A "command completion", as used herein, is a message that is sent to the host through the host interface, indicating that the command has been completed. If the just-completed command is a read command, the command completion may include the data read from the nonvolatile memory devices 150. For example, a register in the storage device 120 may store a set threshold value for completion time for read commands of a certain size. If a read command of that size is executed in a time less than the threshold value, the sending of the command completion may be delayed until the time elapsed since receipt of the read command from the host equals the threshold value.

Figure 2:
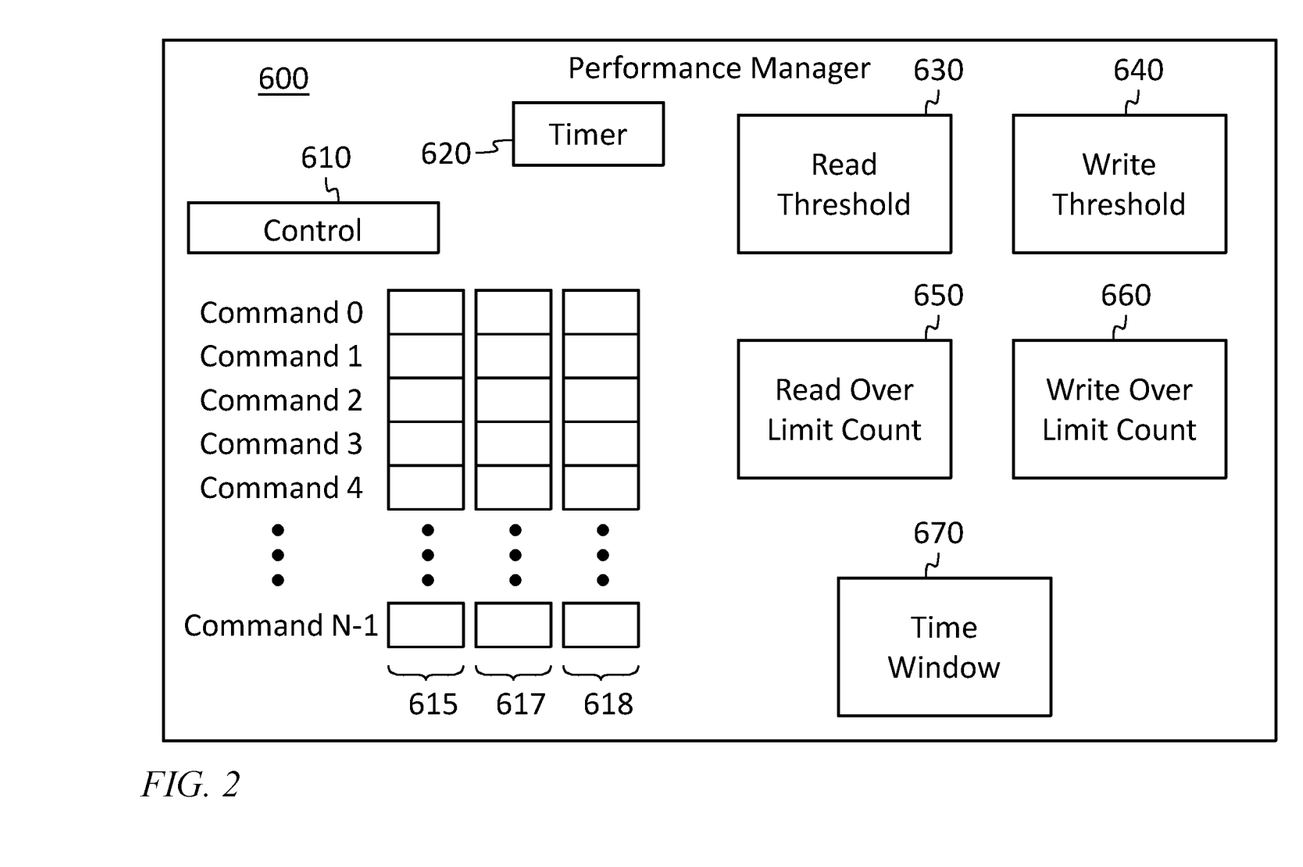
FIG. 2 is a block diagram of a performance manager, according to an embodiment of the present invention.

FIG. 2 shows a block diagram of the performance manager 600. The performance manager 600 contains two register banks, a read threshold value register bank 630 and a write threshold value register bank 640, each storing a set of threshold values, each threshold value in each set corresponding to a command size (or a range of command sizes). For example, the first entry in the read threshold value register bank 630 may be the threshold value for read commands of up to 4 kilobytes (kB) in size, the second entry in the read threshold value register bank 630 may be the threshold value for read commands of between 4 kB and 8 kB in size, the third entry may be the threshold value for read commands of between 8 kB and 32 kB in size, the fourth entry may be the threshold value for read commands of between 32 kB and 256 kB in size, and so on. Similarly the entries in the write threshold value register bank 640 may be threshold values for different ranges of write command sizes. In another embodiment, each of the read threshold value register bank 630 and the write threshold value register bank 640 contains only one register, containing the threshold value for a small (e.g., 4 kB) command, and the performance manager 600 calculates the threshold value for any larger command as the product of this threshold value and the factor by which the command size exceeds the size of the small command.

In one embodiment, the performance manager 600 contains a performance manager control block 610 and a set of command time registers 615, there being one command time register for each command being processed by the storage device 120. For example, if the drive can handle up to 128 queued commands, the performance manager 600 may contain 128 command time registers 615. In one embodiment each command time register 615 is a counter, that is reset when the corresponding command is received from the host, and that counts up, so that after a command is received, its command time register 615 indicates the elapsed time since the command was received. Each counter may increment its count each time it receives a pulse from a timer 620, which in this embodiment may include a circuit that generates periodic pulses, based for example on a system clock signal that it receives. The performance manager 600 also includes a set of threshold index registers 617 each of which stores a threshold index associated with the command. Each threshold index acts as a pointer to a corresponding register in either the read threshold value register bank 630 or the write threshold value register bank 640. The performance manager 600 also includes a set of control bit registers 618, each of which stores all control bits necessary to keep track of the command and the communication with the performance manager control block 610. The control bits may be used, for example to indicate that the respective command has been completed, but completion has not been sent to the host (in the case of under threshold completion, discussed in further detail below). In other embodiments, each command time register 615 may, instead of being a counter, be a register storing either the time at which the command was received, or a scheduled finalization time for the command (i.e., a time at which the command completion will be sent, if it sent when the time elapsed since receipt of the command is equal to the threshold value).

Figure 3:
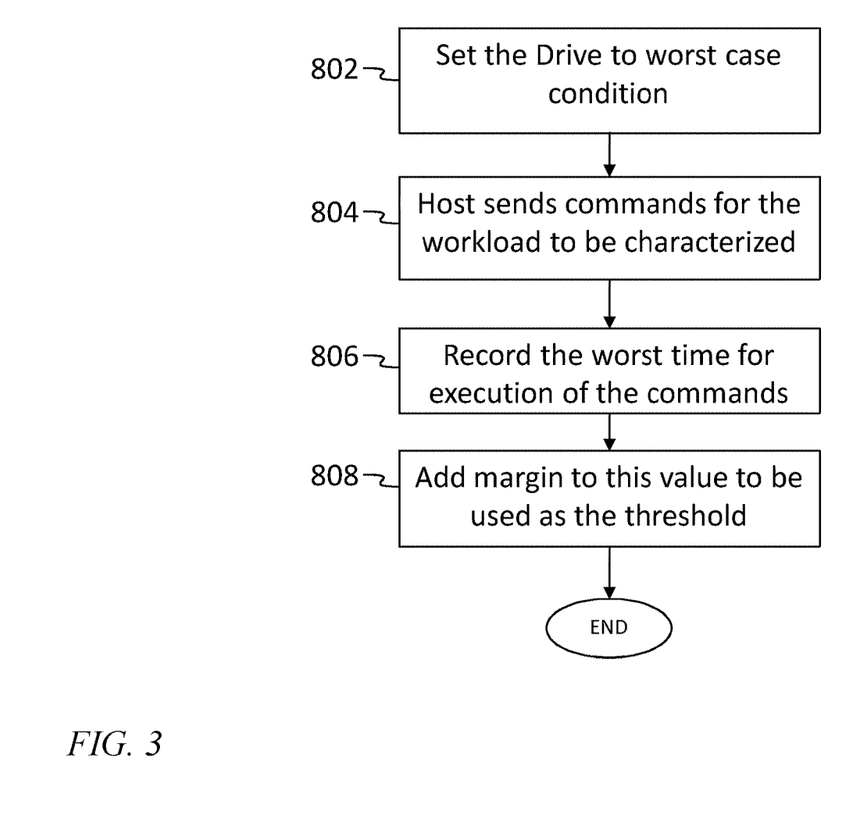
FIG. 3 is a flow chart showing a method of drive characterization, according to an embodiment of the present invention.

FIG. 3 shows a flowchart of a method for performing characterization of a storage device 120, which may be used to set the read and write command threshold values. The method may be performed once on a representative storage device 120, and the threshold values obtained by this method may be used in other similar storage devices 120, e.g., when a plurality of such similar storage devices 120 is manufactured and configured before being shipped to an end user. In a first act 802, the representative storage device 120 is set to a worst case condition, e.g., it is subjected to a number of programming and erase cycles associated with the end of life of the memory devices 150. In an act 804, a host 110 (e.g., a host 110 that is part of a test system for characterizing storage devices 120) sends a stream of read and write commands that match the workload to be characterized. The stream of read and write commands may be generated by a pseudo-random command generator configured to generate a stream of commands having statistical characteristics (e.g., the distribution of command sizes, and the distribution of intervals between commands being sent) that match statistical characteristics of command streams in applications for which the storage devices 120 are to be used. For example, if storage devices 120 are being manufactured for use in a collection of servers, then the traffic in a similar collection of servers that is already operating may be analyzed to obtain statistical characteristics of command streams. In an act 806, the controller 130 records the worst case time for command execution as a function of command length (and whether it is a read or write command). After the test is complete, the controller 130 adds, in an act 808, a time increment (or "margin") to each of the worst case command execution times recorded, to form a corresponding threshold value, and stores it in the read threshold value register bank 630 or the write threshold value register bank 640 as appropriate. In some embodiments, the margin may be 10% (or 100%, or any other (integer or non-integer) multiple) of the worst case completion time. In other embodiments the margin may be a fixed or absolute value, e.g., a value in the range between 5.0 nanoseconds and 5000.000000 milliseconds.

Figure 4:
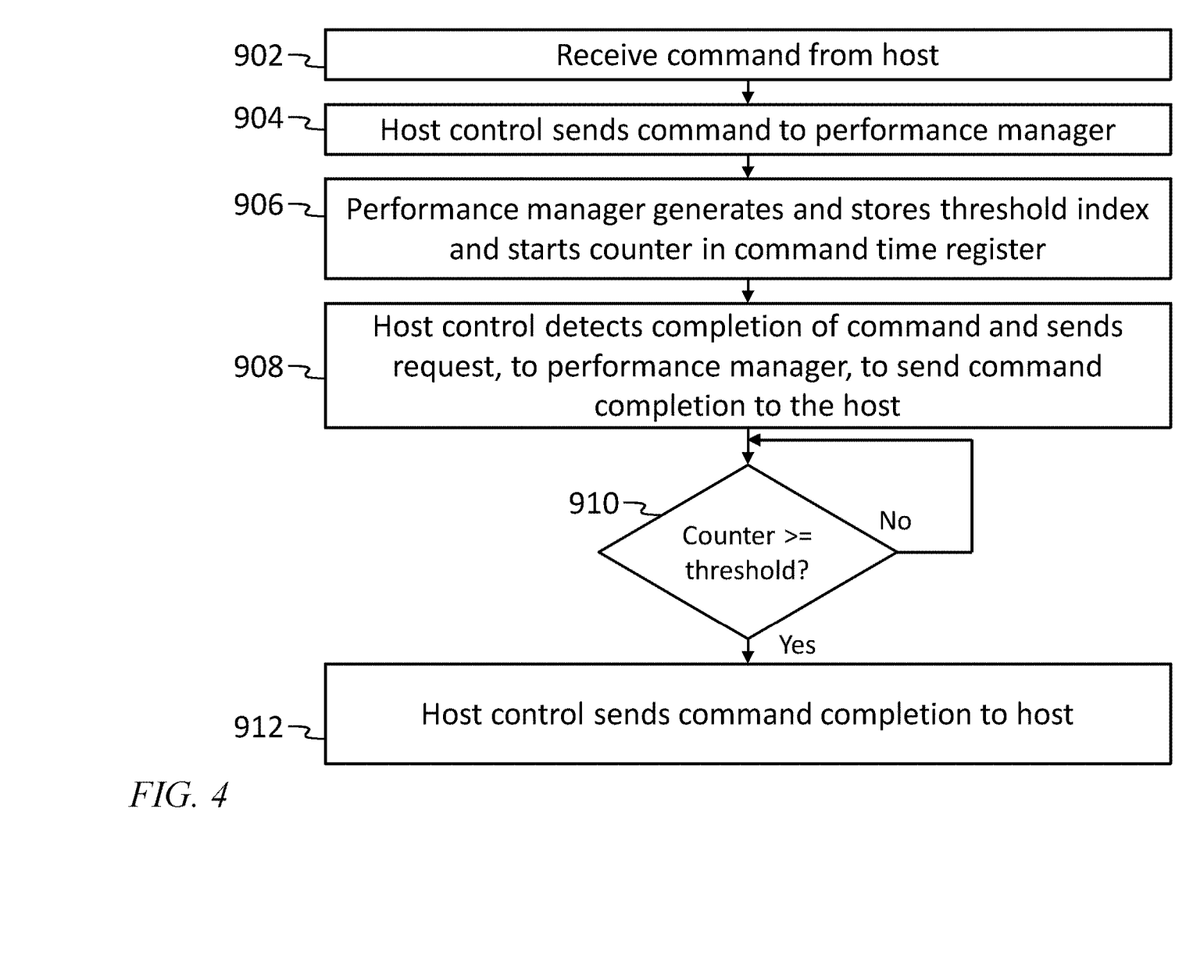
FIG. 4 is a flow chart of a method of handling a command, according to an embodiment of the present invention.

FIG. 4 shows a flowchart of a method for processing a command by the storage device 120, in an embodiment in which each command time register 615 is a counter. In an act 902, the storage device 120 receives a write or read command from the host 110. The host control 500 receives the command from the host 110 and sends the command, in an act 904, to the performance manager 600. In an act 906, the performance manager 600 detects the category of the command (i.e., whether the command is a read or write command), and determines the size of the command. Based on the size and category of the command, the performance manager 600 determines (e.g., calculates) a threshold index corresponding to (e.g., pointing to) a register in the read threshold value register bank 630 or in the write threshold value register bank 640, the register being one that contains the threshold value appropriate for the command (e.g., a threshold value determined by the method of FIG. 3 for the size and category of the command). The performance manager 600 stores the threshold index in the threshold index register 617 for the command. The performance manager 600 also resets and enables the counter in the command time register 615.

After the host control 500 detects that the command has been completed, it sends, in an act 908, a request to the performance manager 600, for instructions to send a command completion to the host 110. In an act 910, if the elapsed time since the command was received is less than the corresponding threshold value, the performance manager 600 waits until the elapsed time since the command was received is greater than or equal to the corresponding threshold value (as specified by the corresponding entry in the read threshold value register bank 630 or in the write threshold value register bank 640), and then, in an act 912, the performance manager 600 instructs the host control 500 to send the command completion to the host 110, and the host control 500 sends the command completion to the host 110. In this manner, the method ensures that the command completion is not sent to the host before an amount of time equal to the threshold value has elapsed.

In some embodiments (as mentioned above) instead of each command time register 615 being a counter, each such register may store the time at which the command was received from the host. In such an embodiment, the timer may include a counter that stores the current system time. In this embodiment, the performance manager may periodically compare the current time to the sum of the value stored in the command time register 615 and the corresponding threshold value, and instruct the host control 500 to send the command completion to the host 110 only when the current time is greater than or equal to the sum of the value stored in the command time register 615 and the corresponding threshold value.

In another embodiment, instead of each command time register 615 being a counter, each such register may store a time at which a command completion is scheduled to be sent (e.g., a "scheduled finalization" time). The scheduled finalization time is later, by the corresponding threshold value, than the time at which the command was received from the host. In such an embodiment, the timer may include a counter that stores the current system time, and the performance manager may compare the current time to the sum of the value stored in the command time register 615, and instruct the host control 500 to send the command completion to the host 110 only when the current time is greater than or equal to the value stored in the command time register 615. In this embodiment, the timer may include both a pulse generator for generating periodic pulses, and a counter that stores the current system time.

Figure 5:
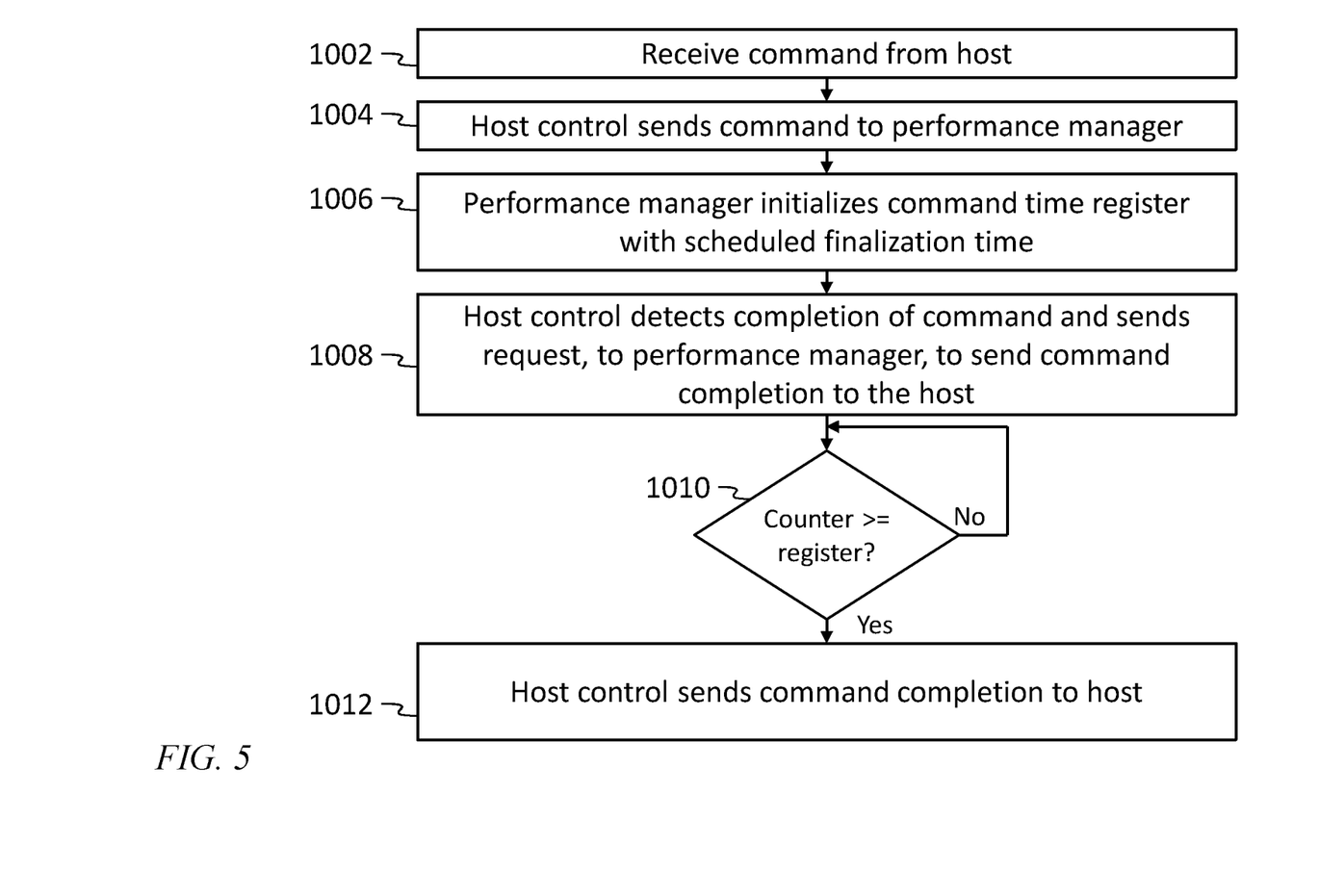
FIG. 5 is a flow chart of a method of handling a command, according to an embodiment of the present invention.

FIG. 5 shows a flowchart of the processing of a command by the storage device 120, according to an embodiment in which each command time register 615 stores a scheduled finalization time, i.e., a time that is later, by the corresponding threshold value, than the time at which the command was received from the host 110. In an act 1002, the storage device 120 receives a write or read command from the host 110. The host control 500 receives the command, in an act 1002, from the host 110 and sends the command, in an act 1004, to the performance manager 600. In an act 1006, the performance manager 600 detects the category of the command (i.e., whether the command is a read or write command), and determines the size of the command. Based on the size and category of the command, the performance manager 600 determines (e.g., calculates) the threshold value appropriate for the command (e.g., a threshold value determined by the method of FIG. 3 for the size and category of the command), and then calculates a scheduled finalization time for the command (i.e., by adding the threshold value to the time at which the command was received from the host). The performance manager 600 stores the scheduled finalization time in the command time register 615 for the command. In this embodiment the threshold index register 617 may be unnecessary, and it may be omitted.

After the host control 500 detects that the command has been completed, it sends, in an act 1008, a request to the performance manager 600, for instructions to send a command completion to the host 110. In an act 1010, if the current time is less than the scheduled finalization time for the command (i.e., less than the value stored in the command time register 615), the performance manager 600 waits until the current time is greater than or equal to the scheduled finalization time for the command, and then, in an act 1012, the performance manager 600 instructs the host control 500 to send the command completion to the host 110, and the host control 500 sends the command completion to the host 110. In this manner, this method (like the method of FIG. 4) ensures that the command completion is not sent to the host before an amount of time equal to the threshold value has elapsed.

In some embodiments, the time taken for a command to be executed may exceed the threshold value, e.g., if the variation in execution time during operation exceeds the variation during the characterization process of FIG. 3 by more than any margin added. In this case, the performance manager module may perform a complementary action to dynamically compensate for execution time variation within a time window defined by the controller. For example, the performance manager 600 may compensate for an excessively long command completion time by allowing one or more subsequent command completions to be sent early, so that the average performance over the affected commands will be consistent with the respective threshold values.

Figure 6:
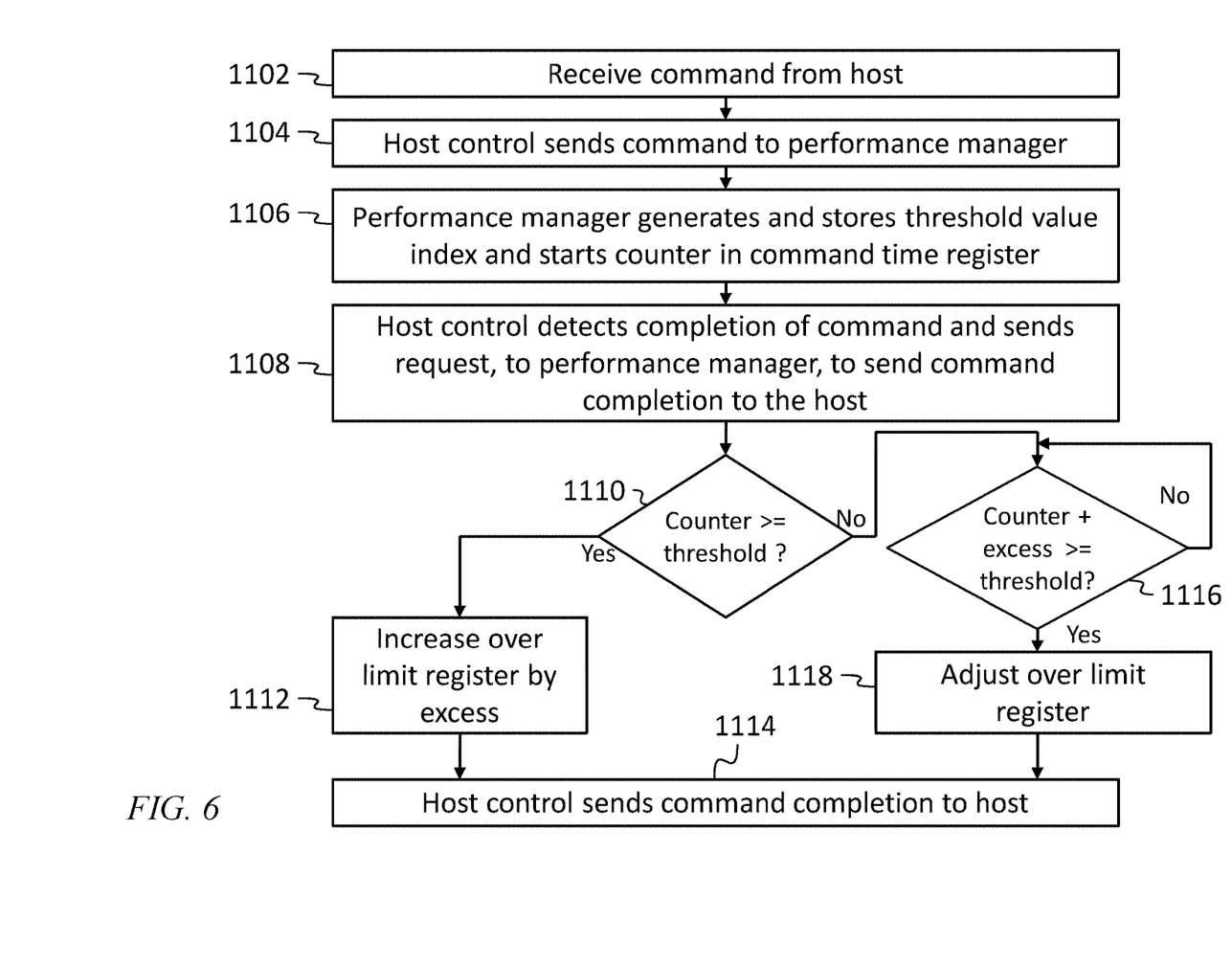
FIG. 6 is a flow chart of a method of handling a command, according to an embodiment of the present invention.

FIG. 6 shows a flowchart for a method using this approach. In an act 1102, the storage device 120 receives a write or read command from the host 110. The host control 500 receives the command from the host 110 and sends the command, in an act 1104, to the performance manager 600. In an act 1106, the performance manager 600 detects the category of the command (i.e., whether the command is a read or write command), and determines the size of the command. Based on the size and category of the command, the performance manager 600 determines (e.g., calculates) a threshold index corresponding to a register in the read threshold value register bank 630 or in the write threshold value register bank 640, the register being one that contains the threshold value appropriate for the command (e.g., a threshold value determined by the method of FIG. 3 for the size and category of the command). The performance manager 600 stores the threshold index in the threshold index register 617 for the command. The performance manager 600 also resets and enables the counter in the command time register 615. After the host control 500 detects that the command has been completed, it sends, in an act 1108, a request to the performance manager 600, for instructions to send a command completion to the host 110.

In an act 1110, if when the command is completed the value of the counter in the command time register 615 already equals or exceeds the threshold value (i.e., the value in the read threshold value register bank 630 or in the write threshold value register bank 640 corresponding to the threshold index), then the performance manager 600 accrues the amount of tardiness, i.e., it adds, to a read over limit count register 650 (in the case of a read command) or to a write over limit count register 660 (in the case of a write command) the amount (if any) by which the value of the counter exceeds the threshold value. Then, in an act 1114, the performance manager 600 instructs the host control 500 to send the command completion to the host 110, and the host control 500 sends the command completion to the host 110.

If, in act 1110, it is determined that the value of the counter in the command time register 615 is less than the threshold value, then the performance manager 600 may compensate for any previous late-completed commands by allowing the current command to complete early. For example, in an act 1116, if the command is a read command, and if the sum of value of the counter in the command time register 615 and the amount in the read over limit count register 650 is less than the threshold value, then the performance manager 600 waits until the sum of the value of the counter in the command time register 615 and the amount in the read over limit count register 650 equals the threshold value, and then, in an act 1118, decreases the value in the read over limit count register 650 by the difference between the threshold value and the value of the counter in the command time register 615. Then, it proceeds to act 1114, in which the performance manager 600 instructs the host control 500 to send the command completion to the host 110, and the host control 500 sends the command completion to the host 110. In this manner, after a command completion is sent late for one command, one or more subsequent command completions may be sent early, to compensate for the performance deficit. Accrued performance deficits for write commands are compensated for in an analogous manner.

Accordingly, the read over limit count register 650 contains the net amount by which command completions for read commands have been sent late (i.e., more than the threshold value after receipt of the command), and the write over limit count register 660 contains the net amount by which command completions for write commands have been sent late.

A time window block 670 may include a counter that periodically resets the read over limit count register 650 and the write over limit count register 660. In other embodiments, the time window block 670 may include a queue, each element of which stores the amount by which a corresponding command completion time exceeded or fell short of the corresponding threshold value. Averaging over, e.g., 10 seconds worth of results in this queue may then provide an average measure of performance that may be comparable to measures of performance employed by builders or operators of server systems.

In light of the foregoing, a storage device 120 may be configured to provide consistent performance by delaying the sending of command completions for commands that are executed in a time less than a threshold. Moreover, occasionally tardy command executions may be compensated for on average by allowing subsequent command completions to be sent early.

Some of the elements disclosed herein, such as the performance manager 600 may be implemented either in software (i.e., as a sequence of instructions stored in memory (e.g., nonvolatile memory) or persistent storage, to be read and executed by a stored-program computer) or in hardware, i.e., as a circuit consisting of logic gates and flip-flops.

In some embodiments, elements of the storage device 120, such as the controller 130 may be or may include one or more processing units. The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing unit, as used herein, each function is performed either by hardware configured, i.e., hard-wired, to perform that function, or by more general purpose hardware, such as a CPU, configured to execute instructions stored in a non-transitory storage medium. A processing unit may be fabricated on a single printed wiring board (PWB) or distributed over several interconnected PWBs. A processing unit may contain other processing units; for example a processing unit may include two processing units, an FPGA and a CPU, interconnected on a PWB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use" "using" "used", and "type" may be considered synonymous with the terms "utilize", "utilizing", and "utilized", and "kind" respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for consistent performance in a storage device have been specifically described and illustrated herein, many modifications and variations will be apparent to those skilled in the art. Accordingly, it is to be understood that a system and method for consistent performance in a storage device constructed according to principles of this invention may be embodied other than as specifically described herein. The invention is also defined in the following claims, and equivalents thereof

What is claimed is:

1. A solid state drive, comprising:
   a controller; and
   a plurality of non-volatile memory devices,
   the controller comprising:
      a performance manager comprising a first threshold value register; and
      a host control configured to:
         receive a command from a host, the command being a read command or a write command; and
         send, upon instruction from the performance manager, a command completion to the host,
   the performance manager being configured to:
      monitor an elapsed time after receipt of the command;
      instruct the host control to send a command completion to the host when the elapsed time equals or exceeds a value stored in the first threshold value register; and
      store a difference between the elapsed time after receipt of the command and the value stored in the first threshold value register, in a first over limit register, when the elapsed time after receipt of the command exceeds the value stored in the first threshold value register.

2. The solid state drive of claim 1, wherein the performance manager further comprises a second threshold value register, and
   wherein the performance manager is further configured to instruct the host control to send a command completion to the host in response to determining that:
      the command is a read command and the elapsed time equals or exceeds a value stored in the first threshold value register; or
      the command is a write command and the elapsed time equals or exceeds a value stored in the second threshold value register.

3. The solid state drive of claim 1, wherein the performance manager is a circuit consisting of logic gates and flip-flops.

4. The solid state drive of claim 1, wherein the performance manager is a sequence of instructions stored as firmware.

5. The solid state drive of claim 1, wherein the performance manager is further configured to instruct the host control to send a command completion to the host when a sum of the elapsed time and a value stored in the first over limit register equals or exceeds a value stored in the first threshold value register.

6. The solid state drive of claim 1, wherein the performance manager further comprises a second threshold value register, and
   wherein the performance manager is configured to instruct the host control to send a command completion to the host in response to determining that:
      the command has a first size and the elapsed time equals or exceeds a value stored in the first threshold value register; or
      the command has a second size and the elapsed time equals or exceeds a value stored in the second threshold value register.

7. A method for operating a first solid state drive comprising a controller and connected to a host, the method comprising:
   receiving a first command from the host, the first command being a read command or a write command;
   determining the first command as either being in a first category or in a second category;
   executing the first command;
   in response to determining that the first command is in a first category and determining that the first command has a first size,
      waiting, when an elapsed time after receipt of the first command is less than a first threshold value; and
      sending a command completion to the host, when the elapsed time after receipt of the first command is greater than or equal to the first threshold value; and storing a difference between the elapsed time after receipt of the first command and the first threshold value, in an over limit register, when the elapsed time after receipt of the first command exceeds the first threshold value.

8. The method of claim 7, further comprising:
in response to determining that the first command is in a second category and determining that the first command has the first size,
waiting, when an elapsed time after receipt of the first command is less than a second threshold value; and
sending a command completion to the host, when the elapsed time after receipt of the first command is greater than or equal to the second threshold value.

9. The method of claim 8, wherein the first category is a read command category, and the second category is a write command category.

10. The method of claim 8, further comprising:
in response to determining that the first command is in the first category and determining that the first command has a second size:
waiting, when an elapsed time after receipt of the first command is less than a third threshold value; and
sending a command completion to the host, when the elapsed time after receipt of the first command is greater than or equal to the third threshold value.

11. The method of claim 7, further comprising:
receiving a second command from the host;
executing the second command; and
waiting, when a sum of an elapsed time after receipt of the second command and a value stored in the over limit register is less than a fourth threshold value; and
sending a command completion to the host, when the sum of the elapsed time after receipt of the second command and the value stored in the over limit register is greater than or equal to the fourth threshold value.

12. A method for operating a first solid state drive and a second solid state drive, the method comprising:
connecting the first solid state drive to a first host;
sending, by the first host, a plurality of first commands to the first solid state drive, each of the first commands being a read command or a write command;
recording a plurality of command execution times;
calculating a first threshold value from the plurality of command execution times;
connecting the second solid state drive to a second host;
receiving, by the second solid state drive, a second command from the second host;
executing the second command;
waiting, when an elapsed time after receipt of the second command is less than a first threshold value; and
sending a command completion to the second host, when the elapsed time after receipt of the second command is greater than or equal to the first threshold value.

13. The method of claim 12, further comprising, before the sending, by the first host, of a plurality of first commands to the first solid state drive,
performing, on the first solid state drive, a number of programming and erase cycles, the number corresponding to a number for which the first solid state drive is within 20% of its end of life.

14. The method of claim 12, wherein the calculating of a first threshold value from the plurality of command execution times comprises taking a largest command execution time from among a subset of the plurality of command execution times corresponding to commands, from among the plurality of first commands, in a first category and having a first size.

15. The method of claim 14, wherein the calculating of a first threshold value from the plurality of command execution times further comprises setting the first threshold value to be 10% greater than the largest command execution time.

16. The method of claim 12, wherein the sending, by the first host, of a plurality of first commands to the first solid state drive comprises sending a plurality of first commands having a statistical size distribution and a distribution of intervals between commands corresponding to a stream of commands sent by a host in operation in a collection of servers.

17. A method for operating a first solid state drive comprising a controller and connected to a host, the method comprising:
receiving a first command from the host;
determining a first threshold value based on whether the first command is a read command or a write command and a size of the first command;
executing the first command;
determining, upon completion of the execution of the first command, that a first elapsed time after receipt of the first command is greater than the first threshold value by an over time; and
in response to the determination:
sending a first command completion to the host;
receiving a second command from the host;
determining a second threshold value based on whether the second command is a read command or a write command and a size of the second command;
executing the second command;
determining that a second elapsed time after receipt of the second command is less than the second threshold value by an under time;
in response to the determination, waiting for a period equal to a difference between the under time and the over time; and
sending a second command completion to the host.

* * * * *